(12) United States Patent
Kang

(10) Patent No.: US 10,187,516 B2
(45) Date of Patent: Jan. 22, 2019

(54) SYSTEMS, NON-TRANSITORY COMPUTER-READABLE MEDIA AND METHODS FOR VOICE QUALITY ENHANCEMENT

(71) Applicants: LINE Corporation, Shinjuku-ku, Tokyo (JP); LINE Plus Corporation, Seongnam-si, Gyeonggi-do (KR)

(72) Inventor: In Gyu Kang, Seongnam-si (KR)

(73) Assignees: Line Corporation, Tokyo (JP); Line Plus Corporation, Seongnam-si (KR)

( * ) Notice: Subject to any disclaimer, the term of this patent is extended or adjusted under 35 U.S.C. 154(b) by 0 days.

(21) Appl. No.: 15/806,848

(22) Filed: Nov. 8, 2017

(65) Prior Publication Data

US 2018/0069958 A1    Mar. 8, 2018

Related U.S. Application Data

(63) Continuation of application No. PCT/KR2016/005625, filed on May 27, 2016.

(30) Foreign Application Priority Data

May 28, 2015 (KR) ........................ 10-2015-0074900

(51) Int. Cl.
    *H04M 3/18*      (2006.01)
    *H04M 3/00*      (2006.01)
    *H04M 3/22*      (2006.01)

(52) U.S. Cl.
    CPC ............ *H04M 3/18* (2013.01); *H04M 3/002* (2013.01); *H04M 3/2236* (2013.01); *H04M 2203/555* (2013.01); *H04M 2207/18* (2013.01)

(58) Field of Classification Search
    CPC .. H04M 3/2236; H04M 3/2227; H04M 7/006; H04M 15/58; H04M 1/605;
(Continued)

(56) References Cited

U.S. PATENT DOCUMENTS

| | | | |
|---|---|---|---|
| 8,135,115 B1 * | 3/2012 | Hogg, Jr. ................ | H04M 1/64 370/260 |
| 9,020,132 B2 * | 4/2015 | Thomson ............ | H04M 3/5175 379/265.03 |

(Continued)

FOREIGN PATENT DOCUMENTS

| KR | 2006-0111036 A | 10/2006 |
|---|---|---|
| KR | 2007-0060883 A | 6/2007 |

(Continued)

*Primary Examiner* — Akelaw Teshale
(74) *Attorney, Agent, or Firm* — Harness, Dickey & Pierce, P.L.C.

(57) ABSTRACT

Provided is a method of controlling an audio characteristic of an electronic device performed by a server, the method including receiving, from a first electronic device, first audio characteristic information that is measured during a call of the first electronic device; receiving, from the first electronic device, first device characteristic information of the first electronic device; first classifying the first audio characteristic information based on the first device characteristic information; generating environment setting information based on classified audio characteristic information including the first classifying; receiving, from a second electronic device among the plurality of electronic devices, second device characteristic information of the second electronic device; and transmitting second environment setting information corresponding to the second device characteristic information to the second electronic device, wherein the second environment setting information is applied to control an audio characteristic for a call of the second electronic device.

19 Claims, 7 Drawing Sheets

(58) Field of Classification Search
CPC .. H04M 9/082; H04M 1/6041; H04M 1/6075; H04M 3/002; H04M 3/56; H04M 11/007; H04M 19/042; H04M 1/20; H04M 1/24; H04M 1/6033; H04M 1/72558; H04M 2207/18; H04M 3/01
USPC ............ 379/202.01, 32.01, 242, 257, 26.01, 379/388.01, 290.01, 88.01, 90.01, 406.06
See application file for complete search history.

(56) References Cited

U.S. PATENT DOCUMENTS

| | | | |
|---|---|---|---|
| 9,185,613 B2* | 11/2015 | Dinan | H04W 36/30 |
| 2008/0225884 A1* | 9/2008 | Crandall | H04M 1/60 |
| | | | 370/464 |
| 2013/0260893 A1 | 10/2013 | Shin et al. | |
| 2013/0332543 A1 | 12/2013 | Shin et al. | |
| 2014/0019540 A1 | 1/2014 | Shin et al. | |

FOREIGN PATENT DOCUMENTS

| | | |
|---|---|---|
| KR | 2007-0075569 A | 7/2007 |
| KR | 2010-0011110 A | 2/2010 |
| KR | 2013-0014129 A | 2/2013 |
| WO | WO-2015/065001 A1 | 5/2015 |

* cited by examiner

SYSTEMS, NON-TRANSITORY COMPUTER-READABLE MEDIA AND METHODS FOR VOICE QUALITY ENHANCEMENT

CROSS-REFERENCE TO RELATED APPLICATION(S)

This application is a continuation of International Patent Application No. PCT/KR2016/005625 filed on May 27, 2016, claiming priority based on Korean Patent Application No. 10-2015-0074900 filed on. May 28, 2015, the contents of all of which are incorporated herein by reference in their entirety.

BACKGROUND

Field

One or more example embodiments relate to technology for voice quality enhancement, and more particularly, to systems, non-transitory computer-readable media and methods for enhancing sound quality during a call by controlling an audio characteristic of an electronic device.

Description of Related Art

There are various types of voice call devices, and characteristics of a corresponding microphone, speaker, etc., are different for each type. Thus, it is difficult to maintain excellent call quality in all call devices using a single solution.

A voice quality enhancement system according to a related art analyzes voice data that is input to a device, enhances voice quality based on an analysis result thereof, and stores a setting value used for enhancing the voice quality in the device. In this case, the voice quality enhancement system may reuse the setting value for subsequent calls and update the setting value.

However, the voice quality enhancement system involves a period of adjustment over a plurality of calls until the voice quality stabilizes. That is, the voice quality may not be guaranteed until a setting value is adjusted through the plurality of calls. Also, if a stored setting value disappears, an analysis and a setting are performed again to provide the voice quality enhancement of the corresponding device.

In another related art, a server provides a setting value for each device. However, in the related art, a server side operator purchases various types of devices, measures an audio characteristic for each device, prepares a setting value for each device, and provides the setting value to each corresponding device.

However, in the related art, the server side measures an audio characteristic and a setting value one by one with respect to various types of devices. Thus, relatively great cost may be used to construct an initial system. In addition, maintenance and repair cost is great since a setting value may be to be measured again for each device in response to addition of a device or upgrade of software of existing devices (call related software). Also, the server side uses a preparation period for a new setting value with respect to a new device or an upgraded device.

SUMMARY

One or more example embodiments provide systems, non-transitory computer-readable media and methods that may collect an audio characteristic signal of an electronic device during a call of the electronic device through an application that is installed and executed on the electronic device, may classify the collected audio characteristic signal for each device characteristic, for example, each type, each operating system (OS), and each country, may generate environment setting information for each device characteristic, and may provide the generated environment setting information to electronic devices of which voice quality enhancement is desired.

According to some example embodiments, there is provided method of controlling an audio characteristic of an electronic device performed by a server, the method includes receiving, from a first electronic device, first audio characteristic information that is measured during a call of the first electronic device under control of a first application that is installed and executed on the first electronic device. The method further includes receiving, from the first electronic device, first device characteristic information of the first electronic device that is collected by the first electronic device under control of the first application. The method further includes first classifying the first audio characteristic information based on the first device characteristic information. The method further includes generating environment setting information corresponding to device characteristic information of each of a plurality of electronic devices, including first environment setting information corresponding to the first device characteristic information, based on classified audio characteristic information including the first classifying. The method further includes receiving, from a second electronic device among the plurality of electronic devices, second device characteristic information of the second electronic device that is collected by the second electronic device under control of a second application that is installed and executed on the second electronic device. Furthermore, the method includes transmitting second environment setting information corresponding to the second device characteristic information to the second electronic device, wherein the second environment setting information is applied under control of the second application to control an audio characteristic for a call of the second electronic device.

Audio characteristic information measured during the call of the second electronic device may be received from the second electronic device under control of the application that is executed on the second electronic device and may be further classified based on the device characteristic information of the second electronic device.

The audio characteristic information may include at least one of an echo return loss (ERL), a residual echo level (LRES), an echo return loss enhancement (ERLE), a noise level, and an average voice level.

The device characteristic information may include first information associated with at least one of information used to specify a type of the electronic device or an operating system (OS), a specification associated with a performance of the electronic device and a specification associated with an audio characteristic of the electronic device, and may further include second information associated with at least one of a call area of the electronic device and a call mode of the electronic device.

The specification associated with the audio characteristic of the electronic device may include at least one of a system delay of the electronic device, an audio clipping of the electronic device, power noise of the electronic device, a clock of a microphone included in the electronic device, a clock of a speaker included in the electronic device, and whether a voice quality enhancement (VQE) system is supported in the electronic device.

The audio characteristic information may be statistically classified based on the device characteristic information, and the environment setting information may include an environment setting value of the electronic device that is set based on the statistically classified audio characteristic information according to a corresponding device characteristic.

According to some example embodiments, there is provided a method performed by an electronic device of a plurality of electronic devices to control an audio characteristic of the electronic device, the method includes collecting device characteristic information and transmitting the device characteristic information to a server under control of an executed application. The method further includes receiving, during a call, environment setting information provided by the server based on the device characteristic information under control of the executed application. The method further includes applying the environment setting information to control an audio characteristic for voice quality enhancement of the call. The method further includes analyzing voice data input during the call and collecting audio characteristic information. Furthermore, the method includes transmitting the audio characteristic information to the server, wherein, at the server, audio characteristic information transmitted from the plurality of electronic devices are classified based on corresponding device characteristic information transmitted from the plurality of electronic devices, and environment setting information corresponding to respective device characteristic information is generated based on the classified audio characteristic information corresponding to respective device characteristic information.

According to some example embodiments there is provided a non-transitory computer-readable medium storing program code including instructions that, when executed by one or more processors, cause the one or processors to perform operations including receiving, from a first electronic device, first audio characteristic information that is measured during a call of the first electronic device under control of a first application that is installed and executed on the first electronic device. The operations further include receiving, from the first electronic device, first device characteristic information of the first electronic device that is collected by the first electronic device under control of the first application. The operations further include first classifying the first audio characteristic information based on the first device characteristic information. The operations further include generating environment setting information corresponding to device characteristic information of each of a plurality of electronic devices, including first environment setting information corresponding to the first device characteristic information, based on classified audio characteristic information including the first classifying. The operations further include receiving, from a second electronic device among the plurality of electronic devices, second device characteristic information of the second electronic device that is collected by the second electronic device under control of a second application that is installed and executed on the second electronic device. Furthermore, the operations include transmitting second environment setting information corresponding to the second device characteristic information to the second electronic device, wherein the second environment setting information is applied under control of the second application to control an audio characteristic for a call of the second electronic device.

According to some example embodiments, there is provided a system including one or more processors and communicating with an electronic device through a network. The one or more processors include a receiver configured to receive, from the electronic device, audio characteristic information that is measured during a call of the electronic device under control of an application that is installed and executed on the electronic device, and to receive, from the electronic device, device characteristic information of the electronic device that is collected by the electronic device under control of the application; an environment setting information manager configured to classify the audio characteristic information received from the electronic device based on the device characteristic information of the electronic device, and to generate and manage environment setting information for each device characteristic based on the classified audio characteristic information for each device characteristic; and an environment setting information transmitter configured to transmit environment setting information corresponding to the collected device characteristic information to the electronic device, and the environment setting information transmitted to the electronic device is applied under control of the application that is executed on the electronic device and an audio characteristic for a call of the electronic device is controlled.

According to some example embodiments, there is provided a system including one or more processors and communicating with a server through a network. The one or more processors include a transmitter configured to collect device characteristic information and to transmit the collected device characteristic information to the server under control of an executed application; an environment setting information receiver configured to connect to the server and to receive environment setting information provided from the server based on the device characteristic information under control of the application during a call; an audio characteristic controller configured to apply the environment setting information and to control an audio characteristic for voice quality enhancement of the call; and an audio characteristic information collector configured to analyze voice data input during the call and to collect audio characteristic information, and the transmitter is configured to transmit the collected audio characteristic information to the server, and, at the server, audio characteristic information transmitted from electronic devices are classified based on device characteristic information transmitted from the electronic devices, and environment setting information for each device characteristic is generated and managed based on the classified audio characteristic information for each device characteristic.

According to some example embodiments, it is possible to collect an audio characteristic signal of an electronic device during a call of the electronic device through an application that is installed and executed on the electronic device, to classify the collected audio characteristic signal for each device characteristic, for example, each type, each OS, and each country, to generate environment setting information for each device characteristic, and to provide the generated environment setting information to electronic devices of which voice quality enhancement is desired.

According to some example embodiments, although a separate period of adjustment is absent, it is possible to guarantee a stable call quality based on statistics of audio characteristics about a plurality of terminals corresponding to the same device characteristic. Also, it is possible to reduce a measurement period and cost for a newly released electronic device or an upgraded electronic device and to reduce construction cost of an initial system.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Some example embodiments will be described in more detail with regard to the figures, wherein like reference numerals refer to like parts throughout the various figures unless otherwise specified, and wherein.

Figure 1:
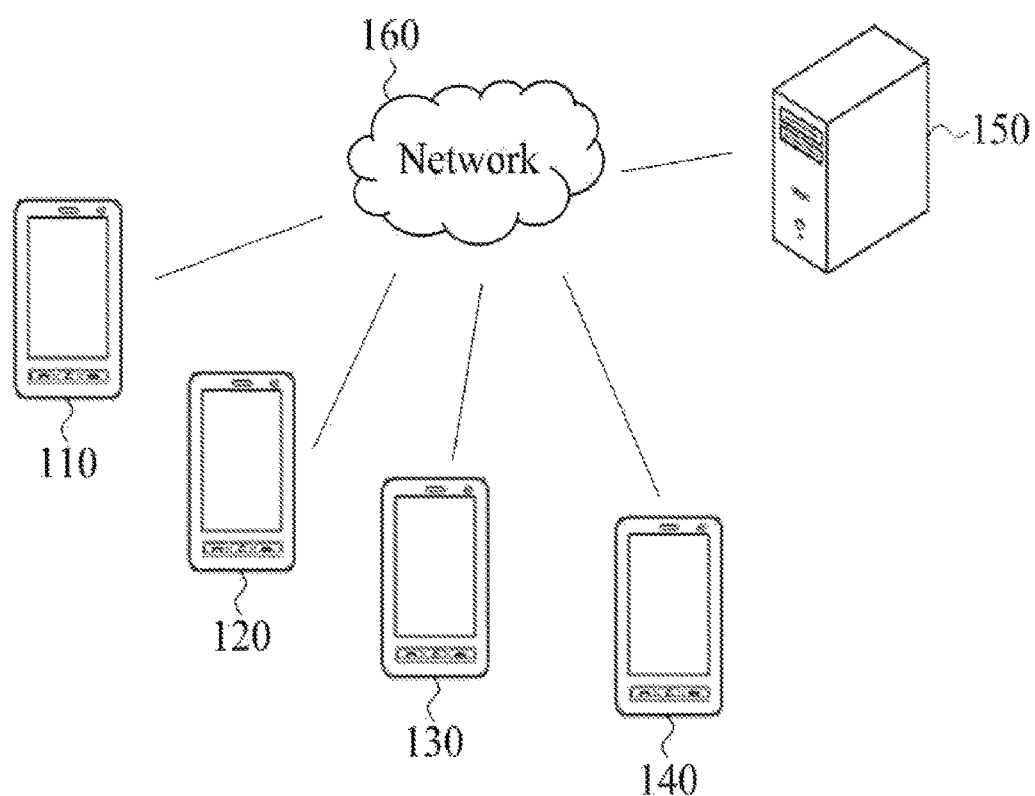
FIG. 1 illustrates an example of an operation environment of a system for voice quality enhancement according to some example embodiments.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given example embodiment, and should not be interpreted as defining or limiting the range of values or properties encompassed by some example embodiments.

DETAILED DESCRIPTION

One or more example embodiments will be described in detail with reference to the accompanying drawings. Example embodiments, however, may be embodied in various different forms, and should not be construed as being limited to only the illustrated example embodiments. Rather, the illustrated example embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Ex pie embodiments may be described with reference to acts and representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing some example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for use in some example embodiments, or they may be known devices that are altered and/or modified for use in some example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

FIG. 1 illustrates an example of an operation environment of a system for voice quality enhancement according to some example embodiments.

Referring to FIG. 1, the operation environment of the system may include electronic devices 110, 120, 130, and 140, a server 150, and a network 160.

The electronic devices 110, 120, 130, and 140 are used as an example of a device capable of making a voice call with another device. Although FIG. 1 illustrates four electronic devices 110, 120, 130, and 140, it is provided as an example only. Each of the electronic devices 110, 120, 130, and 140 may be a fixed terminal or a mobile terminal. For example, each of the electronic devices 110, 120, 130, and 140 may be a smartphone, a mobile phone, a navigation device, a personal computer, a laptop computer, a personal digital assistance (PDA), a portable multimedia player (PMP), a tablet personal computer (PC), and the like. That is, any type of device capable of making a voice call with another device using a mobile communication network, wired Internet, wireless Internet, and the like, may be used. The electronic devices 110, 120, 130, and/or 140 may communicate with another electronic device and/or the server 150 through the network 160 in a wireless or wired communication manner.

The network 160 may include at least one network type including, for example, a personal area network (PAN), a local area network (LAN), a campus area network (CAN), a metropolitan area network (MAN), a wide area network (WAN), a broadband network (BBN), the Internet, and the like. Also, the network 160 may include at least one network topology including a bus network, a star network, a ring network, a mesh network, a star-bus network, a tree or hierarchical network, and the like. However, it is provided as an example only and some example embodiments are not limited thereto.

The server 150 may be configured as a device or a plurality of devices that provides a service or content through communication with the electronic devices 110, 120, 130, and/or 140 over the network 160. For example, the server 150 may be a system that provides a service for voice quality enhancement to the electronic devices 110, 120, 130, and/ 140.

Figure 2:
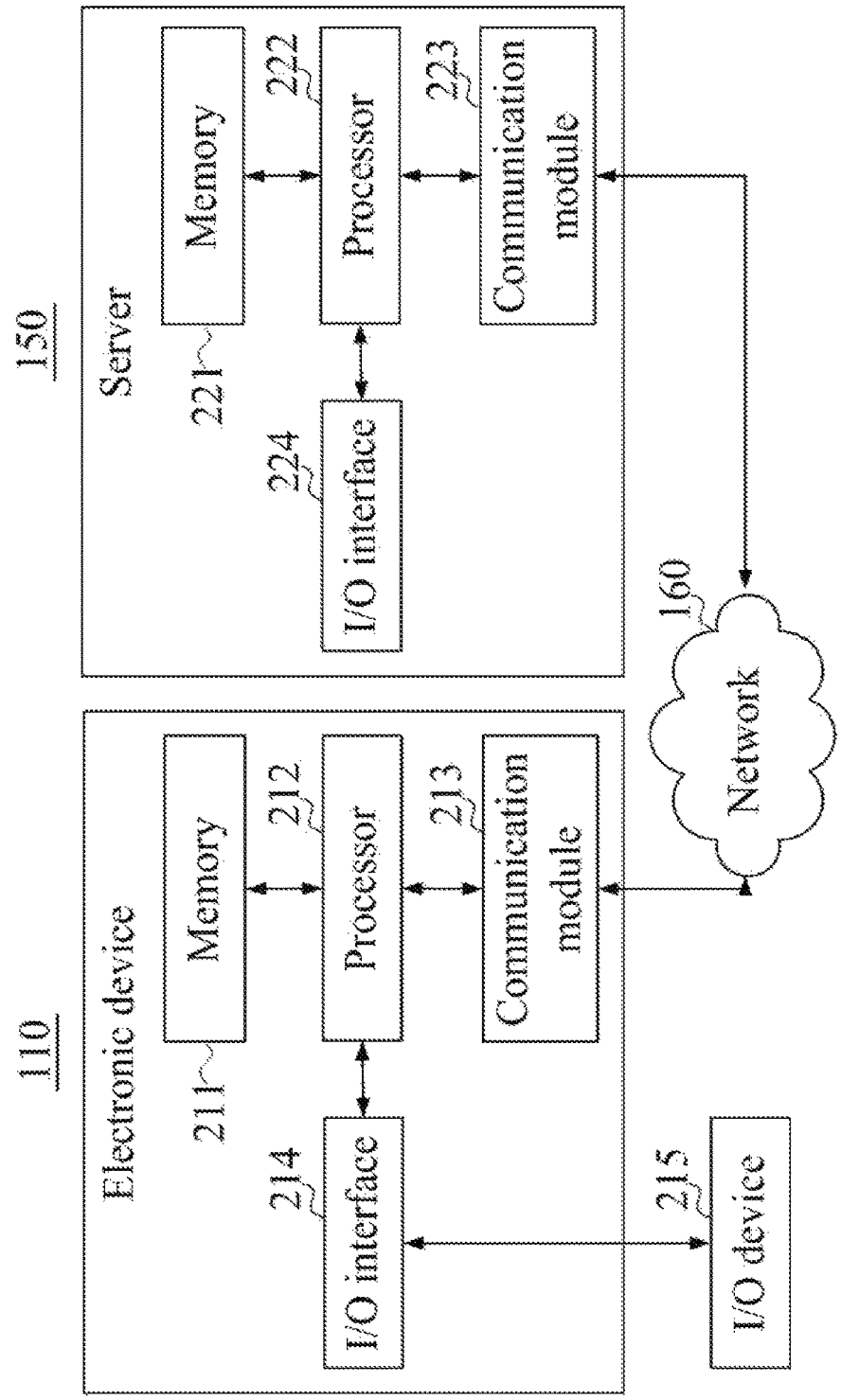
FIG. 2 is a block diagram illustrating a configuration of an electronic device and a server according to some example embodiments.

FIG. 2 is a block diagram illustrating a configuration of an electronic device and a server according to some example embodiments. Referring to FIG. 2, the electronic device 110 may include a memory 211, a processor 212, a communication module 213, and an input/output (I/O) interface 214. The server 150 also may include a memory 221, a processor 222, a communication module 223, and an I/O interface 224.

The memory 211, 221 may include a permanent mass storage device, such as random access memory (RAM), read only memory (ROM), and a disk drive, as a computer-readable recording medium. Also, an OS and at least one program code may be stored in the memory 211, 221. For example, at least one program code may include a code for the electronic device 110 or a code for the server 150 for voice quality enhancement of a voice call. Such software components may be loaded from another computer-readable recording medium separate from the memory 211, 221 using a drive mechanism. The other computer-readable storage medium may include, for example, a floppy drive, a disk, a tape, a DVD/CD-ROM drive, a memory card, etc. According to some example embodiments, software components may be loaded to the memory 211, 221 through the communication module 213, 223 instead of the other computer-readable recording medium. For example, at least one program code may be loaded to the memory 211 based on files provided from developers through the network 160.

The processor 212, 222 may be configured to process a computer program, for example, the aforementioned at least one program code, by performing basic arithmetic operations, logic operations, and I/O operations. The instructions may be provided from the memory 211, 221 or the communication module 213, 223 to the processor 212, 222. In at least some example embodiments, the term "processor," as used in the present disclosure, may include, but is not limited to, a microprocessor, a central processing unit (CPU), a processor core, a multi-core processor; a multiprocessor, an application-specific integrated circuit (ASIC), and a field programmable gate array (FPGA).

The communication module 213, 223 may provide a function for communication with another device through the network 160. Here, the other device may include the server 150 from perspective of the electronic device 110 and the electronic device 110 from perspective of the server 150. For example, a request message created by the processor 212 of the electronic device 110 may be transferred to the server 150 through the communication module 213 and the network 160. Inversely, data transmitted from the server 150 through the communication module 223 and the network 160 may be received by the electronic device 110 through the communication module 213 of the electronic device 110.

The I/O interface 214 may provide a function for connection with an I/O device 215 that is further included in the electronic device 110 or connectable to the electronic device 110. For example, an input device may include a mouse, a keyboard, a touch panel, a microphone, etc., and an output device may include a speaker, a display, a touch screen, etc.

According to some example embodiments, each of the electronic device 110 and the server 150 may further include a greater or lesser number of components than a number of components shown in FIG. 2. However, there is no need to clearly illustrate many components according to the related art. For example, the electronic device 110 may further include other components, for example, a display such as a touch screen, a transceiver, a global positioning system (GPS) module, and the like.

Figure 3:
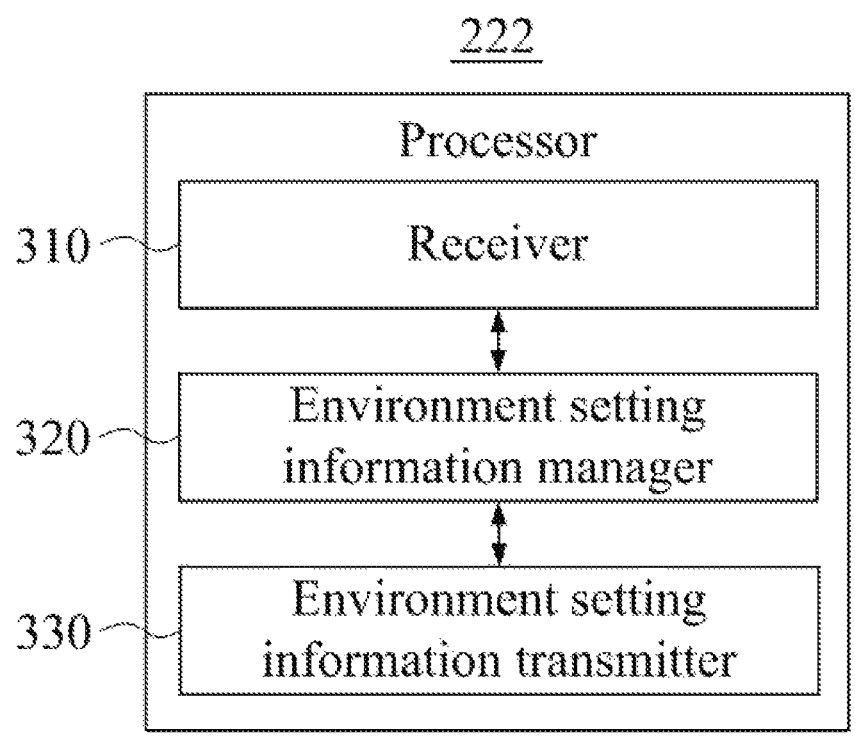
FIG. 3 is a block diagram illustrating a processor included in a server according to some example embodiments.
Figure 4:
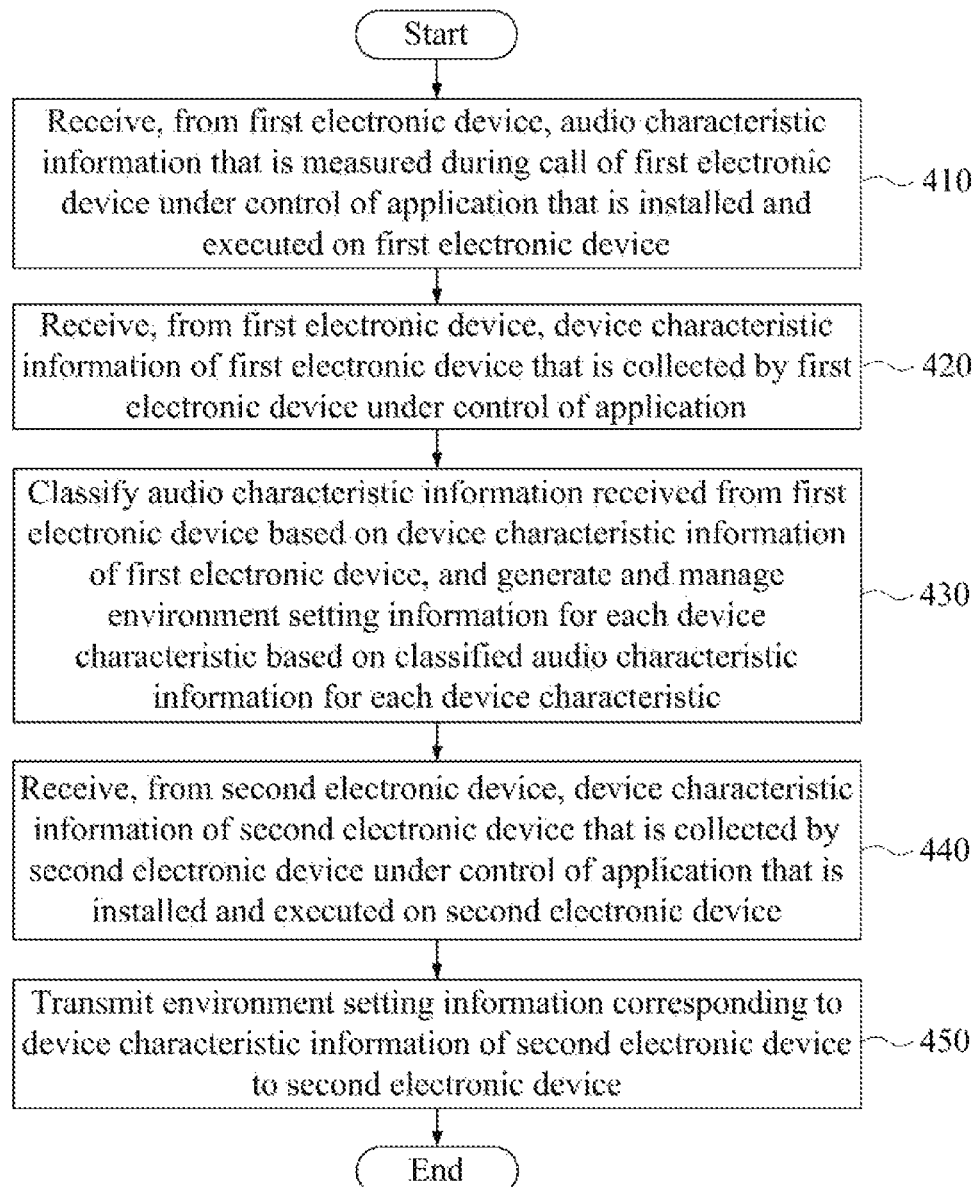
FIG. 4 is a flowchart illustrating a method of controlling a server according to some example embodiments.

FIG. 3 is a block diagram illustrating a processor included in a server according to some example embodiments, and FIG. 4 is a flowchart illustrating a method of controlling a server according to some example embodiments. Referring to FIG. 3, the processor 222 included in the server 150 may include a receiver 310, an environment setting information manager 320, and an environment setting information transmitter 330. The components may be configured to implement operations 410 through 450 included in the control method of FIG. 4 through an OS and at least one program code included in the memory 221. According to some example embodiments, operations described herein as being performed by any or all of the receiver 310, the environment setting information manager 320, and the environment setting information transmitter 330 may be performed by at least one processor (e.g., the processor 222) executing program code that includes instructions corresponding to the operations. The instructions may be stored in a memory of the server 150 (e.g., the memory 221).

In operation 410, the receiver 310 may receive, from a first electronic device, audio characteristic information that is measured during a call of the first electronic device under control of an application that is installed and executed on the first electronic device. The first electronic device may be an example of the electronic device 110 on which the application is installed. Also, the application may correspond to the aforementioned at least one program code and may be installed on the first electronic device to provide a service for voice quality enhancement. The first electronic device on which the application is installed may measure audio characteristic information during a call and may transmit the measured audio characteristic information to the server under control of the application, and the receiver 310 may receive the transmitted audio characteristic information.

The audio characteristic information may include information available for the voice quality enhancement, such as at least one of an echo return loss (ERL), a residual echo level ($L_{RES}$), an echo return loss enhancement (ERLE), a noise level, and an average voice level. Information includable in the audio characteristic information is further described below.

In operation 420, the receiver 310 may receive, from the first electronic device, device characteristic information of the first electronic device that is collected by the first electronic device under control of the application. The device characteristic information also may be measured and transmitted from the electronic device on which the application is installed to the server under control of the application. The receiver 310 may receive the transmitted device characteristic information.

The device characteristic information may include information associated with at least one of information used to specify a type of the electronic device, for example, the electronic device 110, or an OS, a specification associated with a performance of the electronic device, a specification associated with an audio characteristic of the electronic device, a call area of the electronic device, and a call mode of the electronic device. For example, the specification associated with the audio characteristic of the electronic device may include at least one of a system delay of the electronic device, an audio clipping of the electronic device, power noise of the electronic device, a clock of a microphone included in the electronic device, a clock of a speaker included in the electronic device, and whether a voice quality enhancement (VQE) system is supported in the electronic device. Information includable in the device characteristic information is further described below.

In operation 430, the environment setting information manager 320 may classify the audio characteristic information received from the first electronic device based on the device characteristic information of the first electronic device, and may generate and manage environment setting information for each device characteristic based on the classified audio characteristic information for each device characteristic. For example, the audio characteristic information may be statistically classified based on the device characteristic information. Here, the environment setting information may include an environment setting value of the electronic device that is set based on the statistically classified audio characteristic information according to a corresponding device characteristic. For example, audio characteristic information may be collected from smartphones of an A model, for example, electronic devices of a specific device characteristic, and an environment setting value for a smartphone of the A model may be generated based on a statistical value of the collected audio characteristic information.

In operation 440, the receiver 310 may receive, from a second electronic device, device characteristic information of the second electronic device that is collected by the second electronic device under control of an application that is installed and executed on the second electronic device. The second electronic device also may be the same device as the first electronic device that is provided an example of the electronic device 110 on which the application is installed, or may be a device different from the first electronic device. A method of receiving device characteristic information may be similar or the same as the aforementioned operation 420.

In operation 450, the environment setting information transmitter 330 may transmit environment setting information corresponding to the device characteristic information of the second electronic device to the second electronic device. Once a device characteristic of the second electronic device is verified based on the device characteristic information, the environment setting information transmitter 330 may search for and provide environment setting information corresponding to the verified device characteristic. For example, if the second electronic device corresponds to the smartphone of the A model in the above example, the environment setting information transmitter 330 may transmit, to the second electronic device, the environment setting information that includes an environment setting value generated for the smartphone of the A model.

Here, the environment setting information transmitted to the second electronic device may be applied under control of the application that is executed on the second electronic device, and an audio characteristic for a call of the second electronic device may be controlled As described above, the server may receive audio characteristic information from a plurality of electronic devices, may classify the audio characteristic information based on device characteristic information transmitted from the plurality of electronic devices, and may generate and manage environment setting information for each device characteristic. Accordingly, there is no need for each of the individual electronic devices to generate voice data per call, to generate an environment setting value, and to update and manage the environment setting value. Although the server does not test and verify in advance an audio characteristic by purchasing the individual electronic devices, the server may immediately provide environment setting information suitable for a corresponding device characteristic, based on statistical audio characteristics collected from electronic devices of which audio characteristics are to be controlled.

Here, audio characteristic information of the second electronic device may be collected. For example, under control of the application executed on the second electronic device, audio characteristic information measured during a call of the second electronic device may be received and may be further classified based on device characteristic information of the second electronic device. As described above, every time electronic devices each on which the application is installed make a call, collected audio characteristic information may be statistically classified based on a corresponding device characteristic. Thus, environment setting information for each device characteristic may be constructed further quickly and easily.

Figure 5:
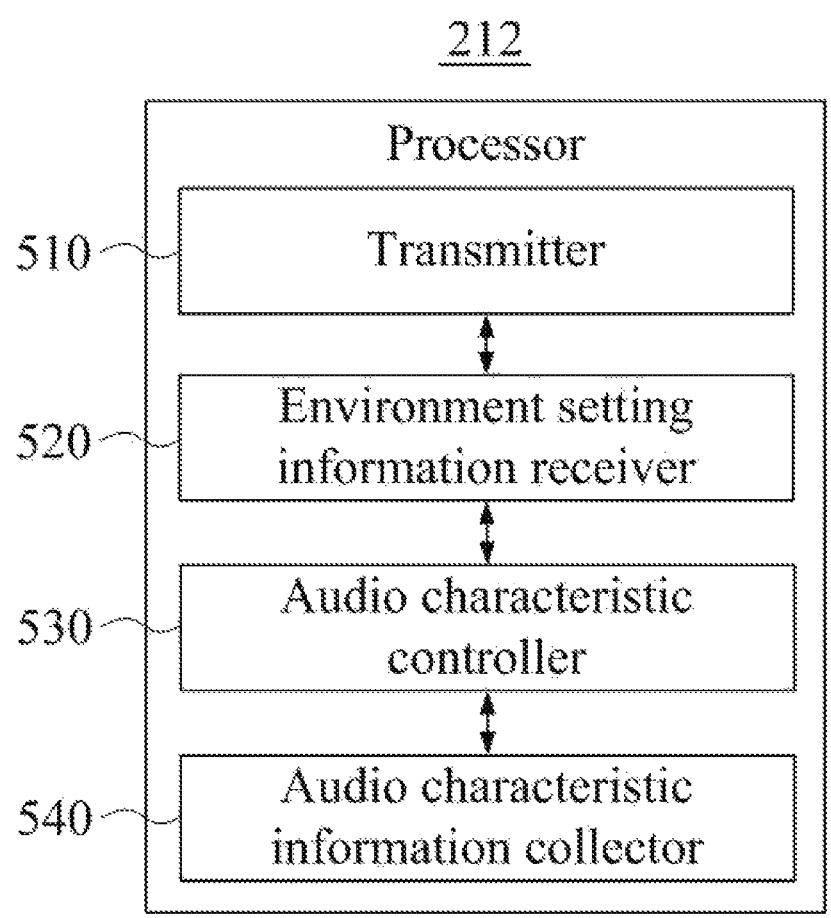
FIG. 5 is a block diagram illustrating a processor included in an electronic device according to some example embodiments.
Figure 6:
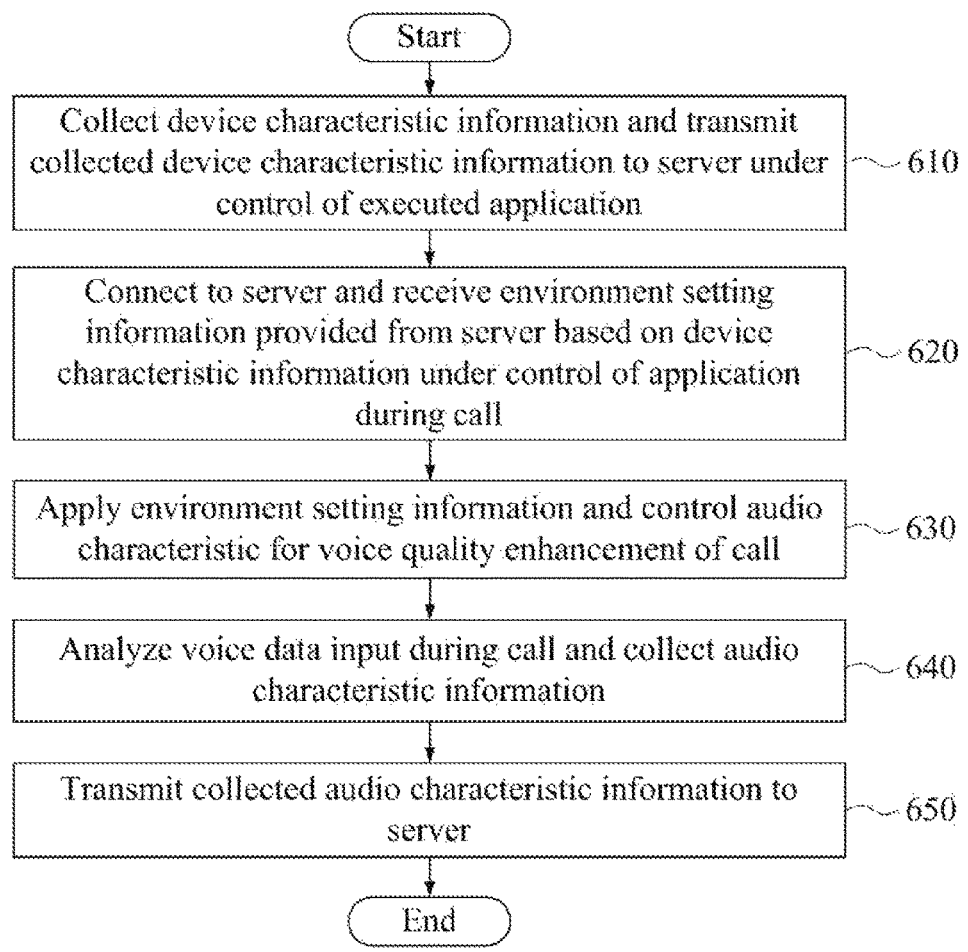
FIG. 6 is a flowchart illustrating a method of controlling an electronic device according to some example embodiments.

FIG. 5 is a block diagram illustrating a processor included in an electronic device according to some example embodiments, and FIG. 6 is a flowchart illustrating a method of controlling an electronic device according to some example embodiments. Referring to FIG. 5, the processor 212 included in the electronic device 110 may include a transmitter 510, an environment setting information receiver 520, an audio characteristic controller 530, and an audio characteristic information collector 540. The components may be configured to implement operations 610 through 650 included in the control method of FIG. 6. According to some example embodiments, operations described herein as being performed by any or all of the transmitter 510, the environment setting information receiver 520, the audio characteristic controller 530, and the audio characteristic information collector 540 may be performed by at least one processor (e.g., the processor 212) executing program code that includes instructions corresponding to the operations. The instructions may be stored in a memory of the electronic device 110 (e.g., the memory 211).

In operation 610, the transmitter 510 may collect device characteristic information and may transmit the collected device characteristic information to a server under control of an executed application. The server may correspond to the aforementioned server 150. As described above, the device characteristic information may include at least one of information used to specify a type of the electronic device, for example, the electronic device 110, or an OS, a specification associated with a performance of the electronic device, a specification associated with an audio characteristic of the electronic device, a call area of the electronic device, and a call mode of the electronic device. For example, the specification associated with the audio characteristic of the electronic device may include at least one of a system delay of the electronic device, an audio clipping of the electronic device, power noise of the electronic device, a clock of a microphone included in the electronic device, a clock of a speaker included in the electronic device, and whether a VQE system is supported in the electronic device. Information includable in the device characteristic information is further described below.

In operation 620, the environment setting information receiver 520 may connect to the server and may receive environment setting information provided from the server based on the device characteristic information under control of the application during a call. For example, at the server, audio characteristic information transmitted from electronic devices may be classified based on device characteristic information transmitted from the electronic devices, and environment setting information for each device characteristic may be generated and managed based on the classified audio characteristic information for each device characteristic. Here, the server may search for environment setting information corresponding to the received device characteristic information and may transmit the retrieved environment setting information to the electronic device 110. The environment setting information receiver 520 may receive the environment setting information from the server. As described above, the server may collect audio characteristic information of the electronic devices, may statistically classify the audio characteristic information for each device characteristic, and may generate and manage environment setting information for each device characteristic. Once the device characteristic information of the electronic device is received in operation 610, the server may retrieve environment setting information corresponding to the received device characteristic information and may transmit the retrieved environment setting information to the electronic device.

In operation 630, the audio characteristic controller 530 may apply the environment setting information and may control an audio characteristic for voice quality enhancement of the call. For example the audio characteristic controller 530 may control various types of setting values using an environment setting value included in the environment setting information.

In operation 640, the audio characteristic information collector 540 may analyze voice data input during the call and may collect audio characteristic information. In operation 650, the transmitter 510 may transmit the collected audio characteristic information to the server. The audio characteristic information transmitted to the server also may be statistically classified based on device characteristic information of the electronic device and used to generate environment setting information.

Figure 7:
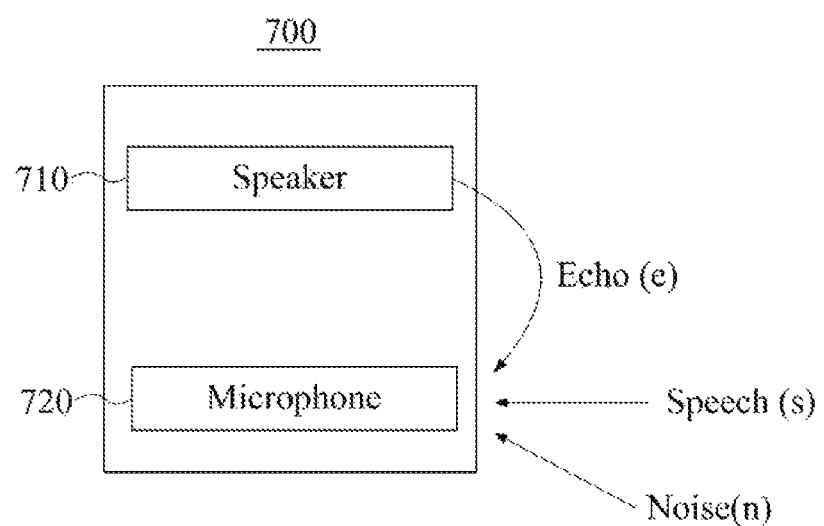
FIG. 7 illustrates an example of a call environment of an electronic device according to some example embodiments.

FIG. 7 illustrates an example of a call environment in an electronic device according to some example embodiments. FIG. 7 illustrates an example in which an electronic device 700 includes a speaker 710 and a microphone 720. Here, a signal x input to and captured at the microphone 720 may be in a form of addition of a speech s, external noise n, and an echo e output through the speaker 710. Here, the echo e may include an echo $e_{linear}$ output having a linear characteristic and an echo $e_{non\text{-}linear}$ having a non-linear characteristic while being output through the speaker 710. For example, the captured signal x may be represented as the following Equation 1.

$$x = s + n + e \quad \text{[Equation 1]}$$

Accordingly, if the external noise n and the echo e are subtracted from the captured signal x, the speech s may be acquired according to the following Equation 2.

$$s = x - n - e \quad \text{[Equation 2]}$$

For example, a VQE system includable in the electronic device may include a function of removing the echo e and the noise n and adjusting a gain.

As device characteristic information, information used to specify a device type may include a product name, a model name, etc., of the electronic device. Information used to specify an OS may include a name, a version, etc. of the OS.

A specification associated with a performance of the electronic device may include at least one of information of a central processing unit (CPU) included in the electronic device and information of a memory included in the electronic device.

As described above, a specification associated with an audio characteristic of the electronic device may include at least one of a system delay of the electronic device, an audio clipping of the electronic device, power noise of the electronic device, a clock of a microphone included in the electronic device, a clock of a speaker included in the electronic device, and whether a VQE system is supported in the electronic device.

The system delay of the electronic device may include delay information between the echo e and the captured signal x, and the audio clipping may include information regarding whether a microphone signal is input within a set magnitude. Also, the power noise may include direct current (DC) power noise. The clock of the microphone may include a sampling rate of the microphone. The clock of the speaker may include information about a clock skew that is a sampling rate of the speaker. As described above, information regarding whether the VQE system is supported in the electronic device may include information regarding whether the aforementioned VQE system is applied to the electronic device.

Also, the call area of the electronic device may include information associated with a country or a location of the electronic device. For example, a preference for a call sound volume may be different for each country and some places or regions may prefer a quiet call. Accordingly, although the electronic device has the same device type, OS, and specification, a volume of the speaker of the electronic device may be adjusted to decrease in an area, such as a hospital or a library, for example.

The call mode of the electronic device may include information regarding whether an additional device, for example, a hands set, a hands free, an ear set, Bluetooth, etc., is used and/or which additional device is being used.

In addition, as described above, the audio characteristic information may include information available for voice quality enhancement, such as at least one of an ERL, a residual echo level ($L_{RES}$), an ERLE, a noise level, and an average voice level.

The ERL indicates a ratio of input echo, that is, an echo ratio. If the ERL has a small value, it may indicate that a large echo is input. The residual echo level $L_{RES}$ indicates a ratio of remaining echo after removing an echo having a linear characteristic. If the residual echo level has a great value, it may indicate that a large amount of echo is removed. Also, the ERLE indicates a ratio of remaining echo after removing an echo having a non-linear characteristic. If the ERLE has a great value, it may indicate that a large amount of remaining echo is removed. The average voice level indicates an average level of speech.

The environment setting value may include a setting value of at least one of a system delay, an acoustic echo cancellation (AEC), a noise suppression (NS), a high power field (HPF), an automatic gain control (AGC), a skew compensation, a VQE system, and a codec of the electronic device.

The following Table 1 shows an example of audio characteristic information and device characteristic information of the electronic device 110 that are collected by the server 150.

TABLE 1

| Device name | iphone6 |
|---|---|
| OS | ios8.3 |
| Call area | Korea |
| Call mode | Hands free |
| System delay | 300 |
| ERL | 0 |
| $L_{RES}$ | 30 |
| ERLE | 50 |
| Noise level | 10 |
| Voice level | 10 |
| Microphone clock | 1 |
| Speaker clock | 0.98 |
| Power noise | 1 |

TABLE 2

| Device name | iphone6 |
|---|---|
| OS | ios8.3 |
| Call area | Korea |
| Call mode | Hands free |
| Average system delay | 300 |
| Standard system delay | 5 |
| Average ERL | 0 |
| Average $L_{RES}$ | 30 |
| Average ERLE | 50 |
| Average noise level | 10 |
| Average voice level | 10 |
| Average SNR | 1 |
| Average microphone clock | 1 |
| Average speaker clock | 0.98 |
| Average power noise | 1 |

The following Table 3 shows an example of a reference quality index. The reference quality index includes information associated with an index of quality that is used as a standard for a specific device characteristic. A corresponding value may be set.

TABLE 3

| Device name | iphone6 |
|---|---|
| OS | ios8.3 |
| Call area | Korea |
| Call mode | Hands free |
| Average system delay | 1 or less |
| Average ERLE | 55 dB or more |
| Average voice level | 30 dB or more |
| Average SNR | 30 dB or more |
| Clock | 0.01 or less |
| Average power noise | 3 or less |

The server 150 may generate a setting value, for example, an environment setting value, for the electronic device 110 of a corresponding device characteristic by comparing the statistical value of Table 2 and the reference quality index of Table 3.

For example, if the server 150 sets an average system delay as the average system delay of Table 2, an average ERLE value of a statistical value does not satisfy the reference quality index. Thus, the server 150 may determine the setting value to reinforce an AEC function. Also, since the average voice level of the statistical value does not satisfy the reference quality index, the server 150 may change a setting to increase an automatic gain control (AGC) level. Since the average SNR of the statistical value does not satisfy the reference quality index, the server 150 may reinforce the NS. In addition, since the clock of the statistical value does not satisfy the reference quality index, the server 150 may change a setting of skew compensation and may change a setting so that an HPF mode is turned OFF to satisfy the average power noise of the reference quality index.

According to the above change, the environment setting information transmitted to the electronic device 110 may be represented as the following Table 4.

TABLE 4

| Call mode | Hands free |
|---|---|
| System delay | 300 |
| AEC mode | 3 |
| NS mode | 4 |
| HPF mode | 0 |
| Skew compensation | 0.02 |
| AGC mode | 4 |

The aforementioned Table 1 through Table 4 are provided as examples only to help the understanding of the present disclosure and some example embodiments are not limited thereto. For example, complexity of the VQE system or the codec may be adjusted based on CPU information. In detail, if a CPU clock is 1.0 gigahertz (GHz), environment setting information may be provided so that at least one of the AEC, the NS, the VQE system, and the codec may use relatively high complexity. If the CPU clock is 0.8 GHz, at least one of the AEC, the NS, the VQE system, and the codec may be set to use relatively low complexity. Here, the high complexity may indicate that a performance for voice quality enhancement is prioritized even though a large calculation amount is used. On the contrary, the low complexity may indicate a reduction in a calculation amount even though the performance for voice quality enhancement is degraded. The complexity of at least one of the AEC, the NS, the VQE system, and the codec may be adjusted based on a size of a memory.

As described above, according to some example embodiments, it is possible to collect an audio characteristic signal of an electronic device during a call of the electronic device through an application that is installed and executed on the electronic device, to classify the collected audio characteristic signal for each device characteristic, for example, each type, each OS, and each country, to generate environment setting information for each device characteristic, and to provide the generated environment setting information to electronic devices of which voice quality enhancement is desired. According to some example embodiments, although a separate period of adjustment is absent, it is possible to guarantee a stable call quality based on statistics of audio characteristics about a plurality of terminals corresponding to the same device characteristic. Also, it is possible to reduce a measurement period and cost for a newly released electronic device or an upgraded electronic device and to reduce construction cost of an initial system.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

Some example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM, random access memory (RAM, flash memory, and the like. Examples of program instructions include both machine code, such as produced by a compiler, and files containing higher level code that may be executed by the computer using an interpreter. The described hardware devices may be to act as one or more software modules in order to perform the operations of the above-described example embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and may be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method performed by a server for controlling an audio characteristic of an electronic device, the method comprising:
   receiving, from a first electronic device of a plurality of electronic devices, first audio characteristic information measured during a first call of the first electronic device, the first audio characteristic information being measured under control of a first application executed on the first electronic device;
   receiving, from the first electronic device, first device characteristic information of the first electronic device, the first device characteristic information being collected under control of the first application;
   first classifying the first audio characteristic information based on the first device characteristic information;
   generating environment setting information corresponding to device characteristic information of each of the plurality of electronic devices based on classified audio characteristic information, the environment setting information including first environment setting information corresponding to the first device characteristic information based on the first classifying;
   receiving, from a second electronic device among the plurality of electronic devices, second device characteristic information of the second electronic device, the second device characteristic information being collected under control of a second application executed on the second electronic device; and
   sending second environment setting information corresponding to the second device characteristic information to the second electronic device, the second environment setting information being applied under control of the second application to control an audio characteristic for a second call of the second electronic device.

2. The method of claim 1, further comprising:
   receiving, from the second electronic device, second audio characteristic information measured during the second call, the second audio characteristic information being measured under control of the second application; and
   second classifying the second audio characteristic information based on the second device characteristic information.

3. The method of claim 2, wherein the receiving the second audio characteristic information is performed after the sending the second environment setting information.

4. The method of claim 1, wherein the first audio characteristic information includes at least one of an echo return loss (ERL), a residual echo level ($L_{RES}$), an echo return loss enhancement (ERLE), a noise level, or an average voice level.

5. The method of claim 1, wherein the device characteristic information includes
first information associated with at least one of
information used to specify a type or an operating system of an electronic device of the plurality of electronic devices,
a specification associated with a performance of the electronic device, or
a specification associated with an audio characteristic of the electronic device, and
second information associated with at least one of a call area or a call mode of the electronic device.

6. The method of claim 5, wherein the specification associated with the performance of the electronic device includes information associated with at least one of a central processing unit (CPU) included in the electronic device or a memory included in the electronic device.

7. The method of claim 5, wherein the specification associated with the audio characteristic of the electronic device includes information associated with at least one of a system delay of the electronic device, an audio clipping of the electronic device, power noise of the electronic device, a clock of a microphone included in the electronic device, a clock of a speaker included in the electronic device, or whether a voice quality enhancement (VQE) system is supported in the electronic device.

8. The method of claim 1, wherein
the first classifying includes statistically classifying the first audio characteristic information based on the first device characteristic information, and
the first environment setting information includes an environment setting value of the first electronic device that is set based on the statistically classified first audio characteristic information according to the first device characteristic information.

9. The method of claim 8, wherein the environment setting value includes a setting value of at least one of a system delay, an acoustic echo cancellation (AEC), a noise suppression (NS), a high power field (HPF), an automatic gain control (AGC), a skew compensation, a VQE system, or a codec of the first electronic device.

10. The method of claim 1, further comprising:
determining the second environment setting information by searching the generated environment setting information using the second device characteristic information, the second environment setting information being the same as the first environment setting information when the second device characteristic information is the same as the first device characteristic information.

11. A method performed by an electronic device of a plurality of electronic devices to control an audio characteristic of the electronic device, the method comprising:
collecting first device characteristic information under control of an executed application;
sending the first device characteristic information to a server under control of the executed application;
receiving first environment setting information provided by the server during a call, the receiving being performed under control of the executed application, the first environment setting information being based on the first device characteristic information;
applying the first environment setting information to control the audio characteristic for voice quality enhancement of the call;
collecting first audio characteristic information by analyzing voice data input during the call; and
sending the first audio characteristic information to the server,
wherein, at the server, audio characteristic information, including the first audio characteristic information, transmitted from the plurality of electronic devices is classified based on corresponding device characteristic information transmitted from the plurality of electronic devices, and environment setting information corresponding to respective device characteristic information is generated based on the classified audio characteristic information corresponding to respective device characteristic information, the environment setting information including the first environment setting information corresponding to the first device characteristic information.

12. The method of claim 11, wherein the audio characteristic information includes at least one of an echo return loss (ERL), a residual echo level ($L_{RES}$), an echo return loss enhancement (ERLE), a noise level, or an average voice level.

13. The method of claim 11, wherein the first device characteristic information includes
first information associated with at least one of
information used to specify a type or an operating system of the electronic device,
a specification associated with a performance of the electronic device, or
a specification associated with an audio characteristic of the electronic device, and
second information associated with at least one of a call area or a call mode of the electronic device.

14. The method of claim 11, wherein
the audio characteristic information is statistically classified based on the corresponding device characteristic information, and
the environment setting information includes an environment setting value that is set based on the statistically classified audio characteristic information according to the corresponding device characteristic information.

15. The method of claim 14, wherein the environment setting value includes a setting value of at least one of a system delay, an acoustic echo cancellation (AEC), a noise suppression (NS), a high power field (HPF), an automatic gain control (AGC), a skew compensation, a VQE system, or a codec of the electronic device.

16. A non-transitory computer-readable medium storing program code including instructions that, when executed by one or more processors, causes the one or more processors to:
receive, from a first electronic device of a plurality of electronic devices, first audio characteristic information measured during a first call of the first electronic device, the first audio characteristic information being measured under control of a first application executed on the first electronic device;
receive, from the first electronic device, first device characteristic information of the first electronic device, the first device characteristic information being collected under control of the first application;
first classify the first audio characteristic information based on the first device characteristic information;

generate environment setting information corresponding to device characteristic information of each of the plurality of electronic devices based on classified audio characteristic information, the environment setting information including first environment setting information corresponding to the first device characteristic information based on the first classification;

receive, from a second electronic device among the plurality of electronic devices, second device characteristic information of the second electronic device, the second device characteristic information being collected under control of a second application executed on the second electronic device; and send second environment setting information corresponding to the second device characteristic information to the second electronic device, the second environment setting information being applied under control of the second application to control an audio characteristic for a second call of the second electronic device.

17. The non-transitory computer-readable medium of claim 16, wherein the first audio characteristic information includes at least one of an echo return loss (ERL), a residual echo level ($L_{RES}$), an echo return loss enhancement (ERLE), a noise level, or an average voice level.

18. The non-transitory computer-readable medium of claim 16, wherein the device characteristic information includes
information associated with at least one of
information used to specify a type or an operating system of an electronic device of the plurality of electronic devices,
a specification associated with a performance of the electronic device, or
a specification associated with an audio characteristic of the electronic device, and
information associated with at least one of a call area or a call mode of the electronic device.

19. The non-transitory computer-readable medium of claim 16, wherein
the first classification includes statistically classifying the first audio characteristic information based on the first device characteristic information, and
the environment setting information includes an environment setting value of the first electronic device that is set based on the statistically classified first audio characteristic information according to the first device characteristic information.

* * * * *